United States Patent Office.

JULIUS C. DITTRICH, OF NEW YORK, N. Y.

PREPARING OZONE WATER.

SPECIFICATION forming part of Letters Patent No. 450,404, dated April 14, 1891.

Application filed July 26, 1890. Serial No. 360,034. (No specimens.)

*To all whom it may concern:*

Be it known that I, JULIUS CARL DITTRICH, a subject of the Emperor of Germany, residing at New York city, in the county and State of New York, have invented a certain new and useful Improvement in Ozone Water and the Method of Making the Same, of which the following is a specification.

My invention relates to the manufacture of ozone water—that is to say, water which is charged with ozone and used for medicinal or other purposes.

My object is to enable the water to retain the ozone for an indefinite length of time without any alteration. Where the water is simply charged with the ozone it is found that in a short time, usually in a few hours, the ozone becomes reconverted into oxygen in its ordinary form. Attempts have been made to remedy this by the introduction into the ozone water of certain chemical substances, those which have hitherto been found most useful being compounds of chlorine, such as hydrochloric acid, to which are added small quantities of chloride of sodium, chloride of magnesia, or other chlorides. While, however, these materials lessen the conversion of the ozone to some extent, it is found necessary where they are used to keep the ozone water where it will not be exposed to light or to an unusually high temperature.

I have found that by the use of those compounds of oxygen and phosphorus, in which the proportion of oxygen is small—that is to say, the phosphites and hypophosphites—the ozone water retains all its original properties for an indefinite time, even if it is exposed to light or to a high degree of heat, and it is in the use of these substances for the purpose mentioned that my invention consists.

In carrying my invention into effect I charge the water with the ozone in any ordinary or suitable way, introducing the ozone into the water either with or without the use of pressure until a sufficient quantity of ozone is absorbed by the water, and I add to the water, either before or after the charging process, a small quantity of the phosphite or hypophosphite. The phosphites or hypophosphites of sodium are suitable for the purpose.

Preferably I place the phosphite or hypophosphite in the water before charging it with ozone. The quantity employed is very small, being, perhaps, in proportion to the quantity of water as one to one thousand, or thereabout.

What I claim is—

1. Water charged with ozone and containing also a small quantity of a phosphite or hypophosphite, substantially as set forth.

2. The herein-described improvement in the process of making ozone water, which consists in first placing in the water a phosphite or hypophosphite and then charging the water with ozone, substantially as set forth.

This specification signed and witnessed this 25th day of July, 1890.

JULIUS C. DITTRICH.

Witnesses:
EUGENE COURAN,
W. PELZER.